United States Patent Office 2,799,701
Patented July 16, 1957

2,799,701
DERIVATIVES OF 2-NAPHTHYLPHOSPHONIC ACID

Karl C. Whitehouse, Somerville, and Hans Z. Lecher, Plainfield, N. J., assignors to American Cyanamid Company, New York, N. Y., a corporation of Maine No Drawing. Application November 3, 1954,
Serial No. 466,696

7 Claims. (Cl. 260—500)

This invention relates to the derivatives of 2-naphthylphosphonic acid having the formula

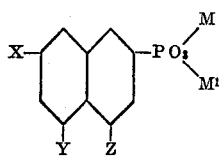

in which X, Y and Z are substituents selected from the class consisting of H, $NO_2$, $NH_2$, OH and $SO_3M^2$, the substituents X and Y being different when selected from the group consisting of H, $NO_2$, $NH_2$ and OH and not more than one of the substituents Y and Z being $SO_3M^2$, and M, $M^1$ and $M^2$ represents cations.

Some of the derivatives are prepared by processes which are similar to those used with beta-naphthalenesulfonic acids. The properties of the products and some of the processes of making the derivatives, however, are quite different due to a radically different behavior of the phosphonic acid group as compared to the sulfonic acid group.

It is well known that when sulfonated compounds are subjected to alkali fusion, the alkali metal salts of the corresponding hydroxy compounds are produced. The behavior of the phosphonic acid group in the 2-position on the naphthalene ring is entirely different. The group cannot be changed into a hydroxy group by alkali fusion. It is not known why there is such a marked difference in the behavior of these two groups, and it is not intended to limit the invention to any theory of why this is so. The peculiar properties of the 2-phosphonic acid group make it possible to prepare a number of derivatives containing hydroxy groups which would otherwise be difficult to prepare because when a sulfonic acid group is introduced this can be transformed into a hydroxy group without affecting the phosphonic acid group.

The following schematic showing of the various types of derivatives which can be produced will illustrate some of the products and processes which can be carried out. For convenience, the different types of products are given roman numerals.

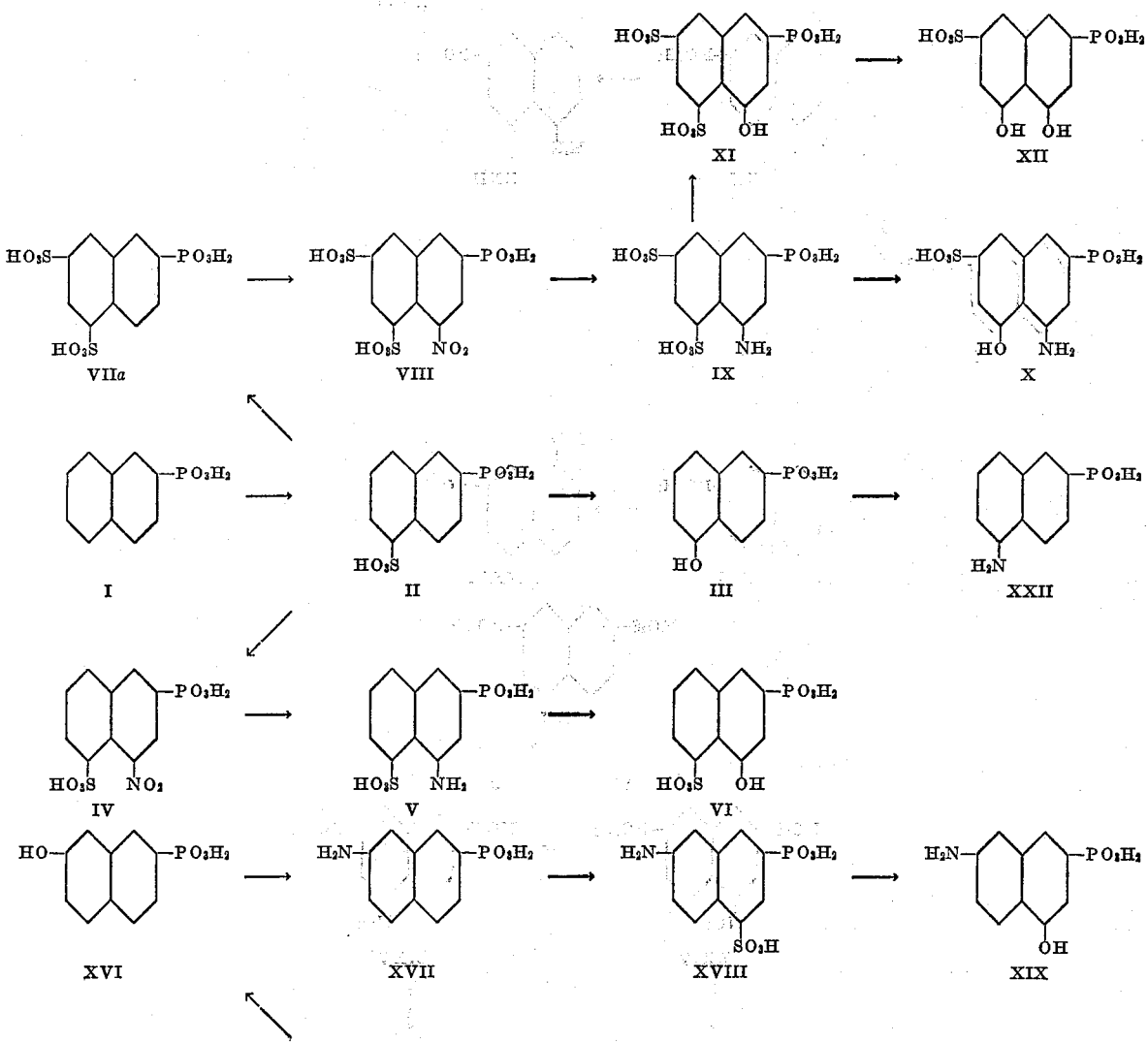

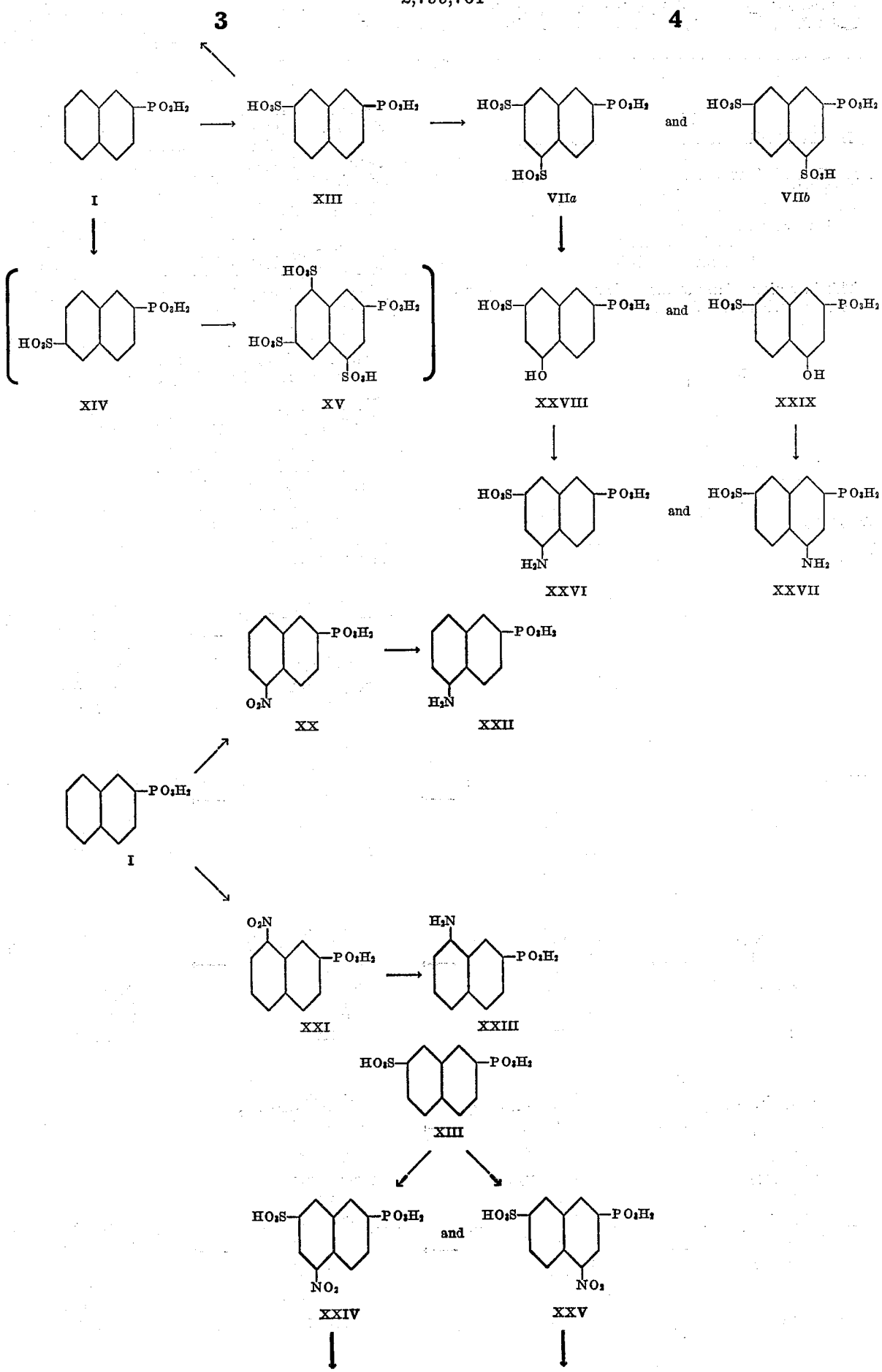

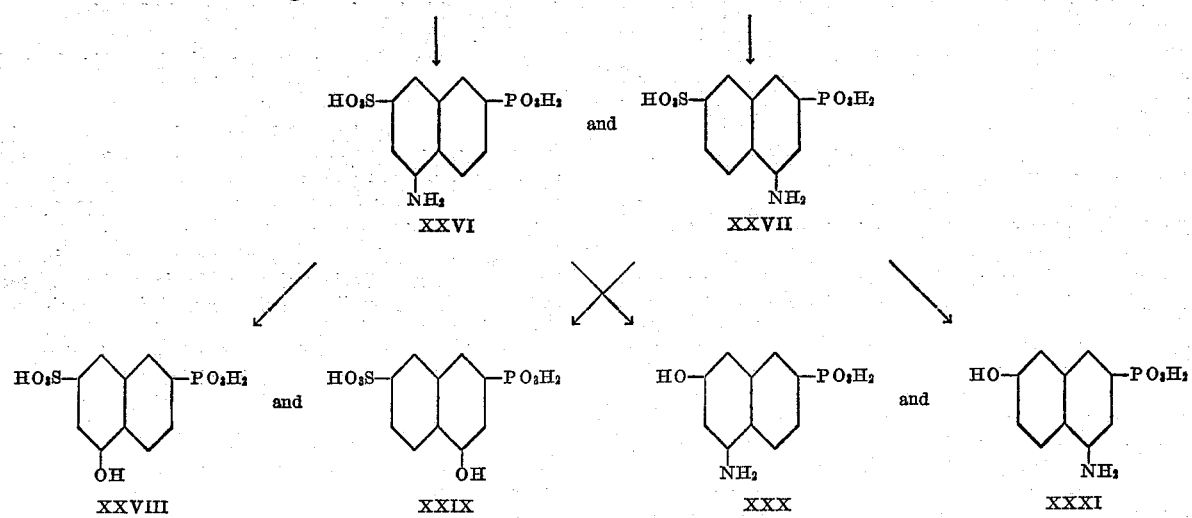

When 2-naphthylphosphonic acid (I) is sulfonated at low temperature, there is obtained the 5-sulfo-2-naphthylphosphonic acid (II). An alkali fusion of this compound replaces only the sulfonic group and not the phosphonic group by hydroxyl and gives the 5-hydroxy-2-naphthylphosphonic acid (III) which can be converted into 5-amino-2-naphthylphosphonic acid (XXII) by a Bucherer reaction.

When the 5-sulfo-2-naphthylphosphonic acid (II) is nitrated, it gives the 4-nitro-5-sulfo-2-naphthylphosphonic acid (IV), which on reduction gives the corresponding amino compound (V). When the latter is heated with dilute acid at an elevated temperature, the amino group is replaced by the hydroxy group and the 4-hydroxy-5-sulfo-2-naphthylphosphonic acid (VI) results.

The high temperature sulfonation of the 5-sulfo-2-naphthylphosphonic acid (II) yields the 5,7-disulfo-2-naphthylphosphonic acid (VIIa), which on nitration gives the 4 - nitro - 5,7 - disulfo - 2 - naphthylphosphonic acid (VIII). Reduction of the latter gives the corresponding amino compound (IX), which by a mild alkaline hydrolysis can be converted into the 4-amino-5-hydroxy-7-sulfo-2-naphthylphosphonic acid (X).

When the 4 - amino - 5,7 - disulfo - 2 - naphthylphosphonic acid (IX) is treated with dilute acid at an elevated temperature, the amino group is replaced by the hydroxy group and the 4-hydroxy-5,7-disulfo-2-naphthylphosphonic acid (XI) results. A mild alkali fusion of the latter gives the 4,5 - dihydroxy - 7 - sulfo - 2 - naphthylphosphonic acid (XII).

When the 2-naphthylphosphonic acid is sulfonated at high temperature, the sulfonic acid enters almost exclusively position 7, i. e., the 7-sulfo-2-naphthylphosphonic acid (XIII) is produced. This fact can be proved by an exhaustive sulfonation which gives 5,7- and 4,7-disulfo-2-naphthylphosphonic acids (VIIa and b), while an isomeric 6-sulfo-2-naphthylphosphonic acid (XIV) would give on exhaustive sulfonation not a di- but a trisulfonic acid, i. e., 4,6,8 - trisulfo - 2 - naphthylphosphonic acid (XV), which, however, is not the case according to our analytical results.

An alkali fusion of the 7-sulfo-2-naphthylphosphonic acid (XIII) gives the 7-hydroxy-2-naphthylphosphonic acid (XVI), which by a Bucherer reaction can be converted into the corresponding amino compound (XVII). Sulfonation of the latter gives the 7-amino-4-sulfo-2-napthylphosphonic acid (XVIII), which upon alkali fusion gives the 7-amino-4-hydroxy-2-naphthylphosphonic acid (XIX).

The 5,7 - disulfo - 2 - naphthylphosphonic acid (VIIa) can be converted into 5-hydroxy-7-sulfo-2-naphthylphosphonic acid (XXVIII) by alkali fusion and the latter into 5 - amino - 7 - sulfo - 2 - naphthylphosphonic acid (XXVI) by a Bucherer reaction. Likewise the mixture of the 5,7- and 4,7-disulfo-2-naphthylphosphonic acids (VIIa and VIIb)—as it is obtained in the high temperature sulfonation of 2-naphthylphosphonic acid—can be subjected to the same sequence of reactions, giving mixtures of the 5- and 4-hydroxy-7-sulfo-2-naphthylphosphonic acids (XXVIII and XXIX) and of the 5- and 4 - amino - 7 - sulfo - 2 - naphthylphosphonic acids (XXVI and XXVII).

The nitration of 7-sulfo-2-naphthylphosphonic acid (XIII) gives a mixture of the 5- and 4-nitro-7-sulfo-2-naphthylphosphonic acids (XXIV and XXV) which can be reduced to a mixture of the corresponding amino acids (XXVI and XXVII). The amino acids give by heating with dilute mineral acid a mixture of the 5- and 4-hydroxy-7-sulfo-2-naphthylphosphonic acids (XXVIII and XXIX) and on alkali fusion a mixture of the 5- and 4-amino - 7 - hydroxy - 2 - naphthylphosphonic acids (XXX and XXXI).

The nitration of 2-naphthylphosphonic acid gives a mixture of the 5- (XX) and 8- (XXI) nitro compounds in which the 5-isomer, however, predominates. Reduction gives a mixture of the corresponding 5- and 8-amino-2-naphthylphosphonic acids (XXII and XXIII).

One of the advantages of the new products of the present invention is that in general they are considerably less soluble than the corresponding derivatives of 2-naphthalenesulfonic acid. This is a definite practical advantage as it makes the isolation of the compounds easier and facilitates good yields and high grades of purity. In general, the compounds of the present invention are produced in good yields and the reactions present no unusual problem.

The products of the present invention are useful as intermediates for the production of azo dyes.

The invention will be described in greater detail in conjunction with the following specific examples in which the parts are by weight unless otherwise specified.

EXAMPLE 1

*5-sulfo-2-naphthylphosphonic acid*

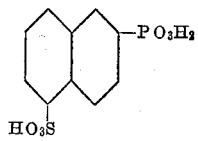

To a stirred and cooled slurry of 10.4 parts of 2-naphthylphosphonic acid mixed with 15 parts of 100% sulfuric acid there is added 13.8 parts of 65% oleum gradually in portions. The resulting black solution is then maintained at room temperature with stirring until reaction is substantially complete and finally drowned in 145 parts of ice. Barium carbonate is added until all excess sulfuric acid is precipitated as barium sulfate which is filtered off. The filtrate contains a monobarium salt of 5-sulfo-2-naphthylphosphonic acid in which one of the hydrogens of the phosphonic group and the hydrogen of the sulfonic group is replaced by the metal. The solution is concentrated until the barium salt precipitates out and is recovered by filtration.

An alternative method of recovering a salt of the 5-sulfo-2-naphthylphosphonic acid involves treating the filtrate from the barium sulfate precipitate with sodium carbonate until the reaction becomes alkaline to phenolphthalein. The barium carbonate is removed by filtration. The filtrate is then evaporated and an excellent yield of the trisodium salt of 5-sulfo-2-naphthylphosphonic acid is obtained. If it is desired to obtain a monosodium salt, the solution of the trisodium salt is acidified with hydrochloric acid until it is acid to Congo red and concentrated, whereupon the monosodium salt precipitates out and is recovered by filtration.

A bis-p-toluidine salt of 5-sulfo-2-naphthylphosphonic acid is obtained by treating the solution of the trisodium salt with p-toluidine hydrochloride until the bis-p-toluidine salt is precipitated. The salt is then recovered by filtration and shows a melting point of 246 to 250° C. The product melts with some decomposition.

The main product of the low temperature sulfonation described above is 5-sulfo-2-naphthylphosphonic acid. There are, however, indications that a small amount of the 8-sulfo isomer is also formed.

Instead of removing the excess sulfuric acid with barium carbonate as described above, the same results can be obtained by using either calcium or barium hydroxides.

EXAMPLE 2

5-hydroxy-2-naphthylphosphonic acid

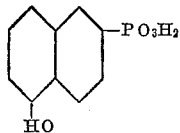

Twelve parts of the trisodium salt of 5-sulfo-2-naphthylphosphonic acid is subjected to an alkali fusion with 15 parts of sodium hydroxide and 3 parts of water. The salt is added to the caustic fusion which is preheated at 260° C. in portions and then the temperature is gradually raised to 320° C., maintained at this temperature until the reaction is substantially complete, and then drowned in 75 parts of water. Concentrated hydrochloric acid is added to the dark brown solution and the sulfur dioxide is expelled by boiling. An oily by-product is removed and more hydrochloric acid is added to the clarified solution, which deposits grayish needles of the desired hydroxy acid. After recrystallization from water, the 5-hydroxy-2-naphthylphosphonic acid is obtained in pure form. The anhydrous product melts at 195–196° C. It gives a ferric chloride test and couples in alkaline solution with diazo compounds.

The above product is coupled with a solution of tetra-azotized dianisidine forming the corresponding disazo dye which is isolated in the conventional manner by adding salt and filtering. The product dyes cotton and rayon in blue shades from an alkaline solution containing Glauber's salt.

EXAMPLE 3

4-amino-5-sulfo-2-naphthylphosphonic acid

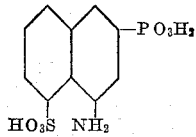

20.8 parts of 2-naphthylphosphonic acid is mixed with 35 parts of 100% sulfuric acid to give an easily stirrable slurry. To this there is added 15 parts of 65% oleum at 20 to 30° C. The mixture is stirred at this temperature for some time, then the temperature raised to 40° C. and stirring continued until the reaction is complete.

The hot solution is then cooled to 15 to 20° C. and 0.3 part of water and then 10.3 parts of 62% nitric acid added gradually. After all of the water has been added the solution is stirred at the same temperature and then the temperature raised with stirring to 25 to 30° C. and maintained at this point until the reaction is complete. After completion the reaction mixture is drowned in 200 parts of water. Barium hydroxide is added to the drowned mixture until all sulfuric acid is precipitated. The barium sulfate is filtered off, washed with hot water and the filtrate treated with soda ash until it shows a strongly alkaline test to phenolphthalein. Thereupon the precipitated barium carbonate is filtered off and the filtrate is concentrated to a volume corresponding to 200 parts of water. This solution is refluxed and 25 parts of iron borings and 35 parts of 50% sulfuric acid are gradually added. During the reduction which takes place, the color changes from brown to gray and finally a dark gray precipitate of the iron salt results. Refluxing is continued after precipitation and finally a little more iron and a little concentrated hydrochloric acid are added until the reaction is complete.

The hot reaction mixture is treated with barium hydroxide until all of the sulfuric acid is precipitated as barium sulfate, diluted and filtered hot. To the filtrate which is yellow in color sufficient sodium carbonate is added to precipitate all of the barium as a carbonate which is then filtered off. 24 parts of concentrated hydrochloric acid is added to the filtrate and on cooling a sodium salt of 4-amino-5-sulfo-2-naphthylphosphonic acid crystallizes out in long fine needles and on analysis shows 1 atom of sodium for each 2 molecules of the acid.

EXAMPLE 4

4-hydroxy-5-sulfo-2-naphthylphosphonic acid

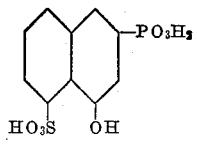

3.2 parts of the hemisodium salt described in Example 3 is heated with 13 parts of water in an autoclave at 180° C. until the reaction is complete.

The black solution obtained is evaporated and leaves behind an ammonium-sodium salt of the 4-hydroxy-5-sulfo-2-naphthylphosphonic acid which contains 1 atom of sodium and 2 ammonium ions for 2 molecules of the acid. The compound gives a ferric chloride test and couples with diazo compounds.

The above product is coupled with a solution of diazotized cresidine under alkaline conditions to give an azo dye which is isolated by adding salt and filtering. The product dyes wool, silk and nylon in crimson shades from an acid solution containing Glauber's salt.

EXAMPLE 5

7-sulfo-2-naphthylphosphonic acid

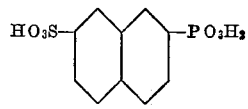

To 394 parts of 99.5% sulfuric acid heated to a temperature of 145–155° C. there is added 219 parts of the hemisodium salt of 2-naphthylphosphonic acid. The salt is obtained by dissolving 2-naphthylphosphonic acid in a caustic soda solution and precipitating with hydrochloric acid and contains 1 atom of sodium for 2 molecules of the acid. The sulfonation mixture is held at 165° C. until reaction is complete and then drowned in 2000 parts of ice water. Barium hydroxide is added to the solution until it becomes alkaline to Congo red. The precipitated barium sulfate is filtered off and to the hot filtrate is added sodium carbonate until the filtrate shows an alkaline reaction to phenolphthalein. The barium carbonate formed is filtered off, the filtrate evaporated giving a good yield of the trisodium salt of 7-sulfo-2-naphthylphosphonic acid.

If the solution of the trisodium salt is treated with hydrochloric acid and concentrated afterwards, then a monosodium salt is obtained which contains 1 atom of sodium for 1 molecule of the acid, but is heavily contaminated by sodium chloride.

When a solution of the barium salt of the 7-sulfo-2-naphthylphosphonic acid is treated with p-toluidine hydrochloride, there is obtained a barium-p-toluidine salt which contains ½ atom of barium and 1 molecule of p-toluidine for 1 molecule of the acid.

EXAMPLE 6

*5,7-disulfo-2-naphthylphosphonic acid and 4,7-disulfo-2-naphthylphosphonic acid*

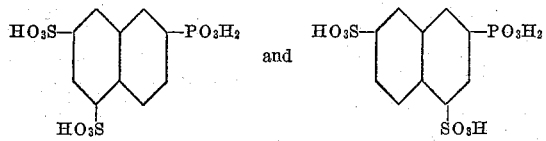

20.8 parts of 2-naphthylphosphonic acid is added to 40 parts of 99.5% sulfuric acid which has been preheated to 160 to 165° C. The mixture is then heated for 2 hours at 160 to 170° C. whereupon 40 parts of 65% oleum is added gradually and the heating continued until reaction is complete. The reaction mixture is then drowned in 500 parts of water and barium hydroxide added to precipitate all excess sulfuric acid, the barium sulfate formed being filtered off. To the filtrate there is added sodium carbonate to just produce an alkaline reaction to phenolphthalein and the barium carbonate formed is filtered off. The sodium salts of the acids are obtained by evaporating the filtrate. Analysis of the residue shows that it contains the sodium salts of di-sulfophosphonic acids which is proof that the product obtained in Example 5 is essentially the 2,7-isomer and does not contain any substantial quantities of the 2,6-isomer. The latter on exhaustive sulfonation should give a trisulfonic acid, namely, the 4,6,8-trisulfo-2-naphthylphosphonic acid, but analysis shows that this does not take place.

If more oleum is used or if the heating is continued too long beyond the completion of the reaction a gradual replacement of the phosphonic group by the sulfonic group takes place. Therefore, the reaction should be stopped when the reaction is complete and not carried on beyond this point.

EXAMPLE 7

*4-amino-5,7-disulfo-2-naphthylphosphonic acid*

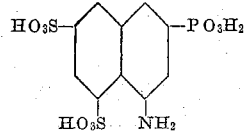

A slurry of 20.8 parts of 2-naphthylphosphonic acid and 40 parts of 100% sulfuric acid is prepared. This slurry is stirred and kept at 25 to 30° C. while there is gradually added 40 parts of 65% oleum. After all the oleum is added, the solution is kept at the same temperature until the monosulfonation is complete and the 5-sulfo-2-naphthylphosphonic acid is formed. Thereupon the temperature is raised to 160 to 170° C. and maintained there until the disulfonation is complete, i. e. the 5,7-disulfo-2-naphthylphosphonic acid is formed. The mixture is cooled to 10° C., 3.3 parts of ice added to hydrate the excess sulfur trioxide and this is followed by 10.3 parts of 62% nitric acid. The mixture is stirred until reaction is complete and then drowned in 200 parts of water. Nitric oxides are removed by blowing of 70° C. and the reaction mixture then cooled to 30° C. whereupon 18 parts of iron borings is added. The temperature is then gradually raised to 70° C. and held there until the reaction is completed. It produces an insoluble iron salt which is recovered by filtration after the reduction mixture has been diluted with water. It is heated with dilute sodium hydroxide solution and iron hydroxide is filtered off. A dark brown filtrate is obtained which is concentrated to a volume corresponding to about 150 parts of water and salted out with common salt and hydrochloric acid at a pH which shows strong acid reaction to Congo red. The precipitate formed is filtered off and washed with brine. It consists of the disodium salt of 4-amino-5,7-disulfo-2-naphthylphosphonic acid mixed with sodium chloride. The product is easily soluble in water. It can be diazotized and the resulting diazo compound can be coupled. In alkaline solution it couples with diazo compounds.

EXAMPLE 8

*4,5-dihydroxy-7-sulfo-2-naphthylphosphonic acid*

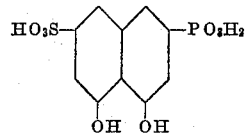

16.4 parts of the disodium salt of the acid produced in Example 7 (mixed with some sodium chloride) is heated with 30 parts of water slightly acidified with sulfuric acid and agitated at 200° C. until reaction is substantially complete. Four parts of sodium hydroxide is then added and the resulting solution evaporated to give the sodium salt a 4-hydroxy-5,7-disulfo-2-naphthylphosphonic acid (XI).

The salt is then added gradually to 90 parts of 40% sodium hydroxide solution at 125° C. The fusion which results is then heated to 170° C. until the reaction at this temperature is about completed and then raised to 220° C. and held there until foaming has ceased. The fusion is dissolved in 100 parts of water and acidified with concentrated hydrochloric acid. A precipitate forms which is the monosodium salt of 4,5-dihydroxy-7-sulfo-2-naphthylphosphonic acid, the precipitate being contaminated with some sodium chloride.

The above compound is coupled with a solution of tetrazotized benzidine under alkaline conditions to give a disazo dye which is isolated by adding salt and filtering. The product dyes cotton and rayon in blue shades from an alkaline solution containing Glauber's salt.

EXAMPLE 9

*4-amino-5-hydroxy-7-sulfo-2-naphthylphosphonic acid*

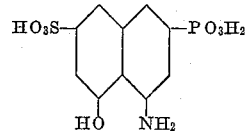

19 parts of the product of Example 7 is heated with 29 parts of a 38% aqueous sodium hydroxide solution at 180° C. for 8 hours. The charge is dissolved in 85 parts of water and acidified with 50% sulfuric acid to give an acid test to Congo red. The precipitate formed is filtered off and washed with brine. The acid gives a test with ferric chloride and couples in alkaline solution. It can be diazotized and the diazo compound couples.

The above product is coupled under alkaline conditions with tetrazotized benzidine to give a disazo dye which is isolated by adding salt and filtering. This dye in a alkaline solution containing Glauber's salt dyes cotton and rayon in blue shades.

The above product is coupled first with diazotized 4-nitroaniline under acid conditions and then with diazotized aniline under alkaline conditions, the product dyes wool, silk and nylon in shades of blue from an acid solution containing Glauber's salt.

The above product is acetylated to give 4-acetamino-5-hydroxy-7-sulfo-2-naphthylphosphonic acid which is coupled in alkaline solution with diazotized aniline to give a dye which is isolated by adding salt and filtering. The product dyes wool, silk and nylon in red shades from an acid solution containing Glauber's salt.

EXAMPLE 10

*7-hydroxy-2-naphthylphosphonic acid*

168 parts of the trisodium salt of 7-sulfo-2-naphthylphosphonic acid is dissolved in 745 parts of 45% sodium hydroxide solution. This solution is heated with agitation at 225° C. until the reaction is complete. The autoclave charge is diluted to a volume corresponding to 2000 parts of water, then concentrated hydrochloric acid is added until the liquid shows an acid reaction to phenolphthalein, but still an alkaline reaction to Brilliant Yellow. At this point some dark insoluble matter is removed by filtration and more concentrated hydrochloric acid is added to produce a strong acid reaction to Benzopurpurine. The solution is boiled to drive off sulfur dioxide and cooled whereupon the acid mixed with sodium chloride precipitates. The product gives a test with ferric chloride and couples with diazo compounds. The above product mixed with beta-naphthol is coupled with diazotized paranitraniline. A red pigment results which is useful in coating compositions such as various printing inks.

EXAMPLE 11

*7-amino-2-naphthylphosphonic acid*

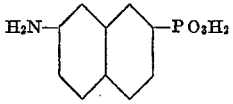

Forty parts of the product of Example 10 is dissolved in a solution of 45 parts of ammonium sulfite and 23 parts of ammonia in 150 parts of water. The solution is heated with agitation at 150° C. until the reaction is complete. After cooling, concentrated hydrochloric acid is added until the reaction is acid to methyl red, the product is filtered off and washed. It is redissolved in sodium hydroxide solution, treated at the boil with Darco, clarified and made acid to Congo red by addition of hydrochloric acid. The sparingly soluble acid is filtered off. It crystallizes with ½ mol. water of crystallization and melts with decomposition at about 295° C. It can be diazotized and the diazo compound couples.

The above product is diazotized and couples with 2-naphthol to give a moderately soluble dye which is isolated by filtering. This product dyes wool, silk and nylon in shades of scarlet from an acid solution.

EXAMPLE 12

*5-amino-2-naphthylphosphonic acid*

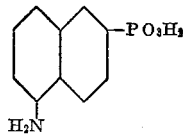

40 parts of 5-hydroxy-2-naphthylphosphonic acid is dissolved in a solution of 45 parts of ammonium sulfite and 23 parts of ammonia in 150 parts of water. The solution is heated with agitation at 150° C. until the reaction is complete. After cooling, concentrated hydrochloric acid is added until the reaction is acid to methyl red and the product is recovered by filtration. It can be diazotized and the diazo compound couples.

The above product is coupled with the monoazo compound obtained by coupling tetrazotized benzidine with one molar equivalent of salicylic acid to produce the disazo dye which is then diazotized and coupled with a second molar equivalent of salicylic acid. The resulting product, after isolation by salting out and filtering, dyes cotton and rayon in brown shades from an alkaline solution containing Glauber's salt.

EXAMPLE 13

*7-amino-4-sulfo-2-naphthylphosphonic acid*

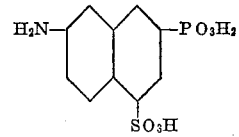

22.5 parts of 7-amino-2-naphthylphosphonic acid is dissolved in 48 parts of 96% sulfuric acid at 65° C. Between 40° and 55° C. there is added 50 parts of 65% oleum. After the charge has been heated at 50 to 55° C. until the reaction is complete, a sample is not any longer precipitated by water. However, the charge is heated for 24 hours longer at 50 to 55° C. and then drowned in 200 parts of ice water, giving a black solution. The precipitate obtained on cooling is redissolved in 300 parts of water at the boil and 30 parts of common salt is added. On cooling, the acid crystallizes out, is filtered off, and washed with 10% brine. It can be diazotized and the diazo compound couples.

EXAMPLE 14

*7-amino-4-hydroxy-2-naphthylphosphonic acid*

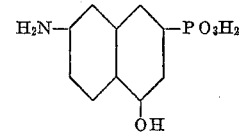

10.7 parts of 7-amino-4-sulfo-2-naphthylphosphonic acid is heated with a mixture of 16 parts of sodium hydroxide and 11 parts of water at 200° C. with agitation until completion of the reaction. After cooling, the charge is drowned in 120 parts of water and there is added to the dark gray thick paste 26 parts of concentrated sulfuric acid. Sulfur dioxide is evolved. The mixture is cooled and then the gray precipitate is filtered off and washed with ice water. It is redissolved in a dilute solution of sodium hydroxide, treated hot with Darco, and filtered. To the filtrate there is added concentrated hydrochloric acid to produce an acid reaction to Benzopurpurine. The acid crystallizes out on cooling mixed with some salt. It gives a ferric chloride reaction and couples. It can be diazotized and the diazo compound couples.

The above product is coupled under alkaline conditions with tetrazotized benzidine forming a disazo dye which is isolated by salting out and filtering. The product dyes cotton and rayon in red shades from an alkaline solution containing Glauber's salt.

EXAMPLE 15

*5- and 8-amino-2-naphthylphosphonic acids*

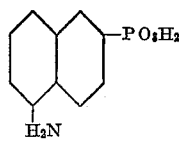 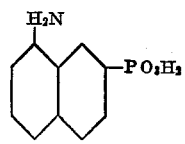

43.8 parts of the hemisodium salt of 2-naphthylphosphonic acid is gradually added with stirring to 300 parts of 85% sulfuric acid at 10 to 20° C. To the resulting thick slurry which is stirred and kept at 0 to 10° C. there is gradually added 21 parts of 60% nitric acid. The temperature is gradually raised to 25° C. and kept there until the reaction is complete. It is drowned in 400 parts of ice and the precipitate of the nitrophosphonic acids is filtered off.

The nitro acids are slurried with 250 parts of concentrated hydrochloric acid and 50 parts of zinc dust is added portionwise while the temperature is gradually raised to 95° C. To the resulting dark liquid there is added a concentrated solution of sodium acetate which results in the precipitation of the aminophosphonic acids in the form of zinc salts. These zinc salts are converted into sodium salts by slurrying them with water and adding a solution of sodium carbonate until the mixture shows an alkaline reaction of phenolphthalein. The precipitated zinc carbonate is filtered off and the filtrate is acidified with concentrated hydrochloric acid whereupon a mixture of aminophosphonic acids precipitates.

The mixed acids are treated as described in the last paragraph of Example 12, producing a disazo dye which dyes cotton and rayon in brown shades from an alkaline solution containing Glauber's salt.

This application is a continuation in part of our copending application, Serial No. 361,088, filed June 11, 1953, now abandoned.

We claim:

1. A compound corresponding to the formula

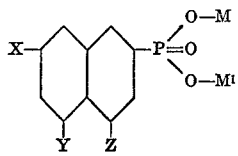

in which X, Y and Z are substituents selected from the class consisting of H, $NO_2$, $NH_2$ OH and $SO_3M^2$, the substituents X and Y being different when selected from the group consisting of H, $NO_2$, $NH_2$ and OH and not more than one of the substituents Y and Z being $SO_3M^2$, and M, $M^1$ and $M^2$ are cations.

2. A compound of the formula:

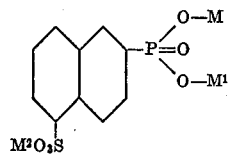

where M, $M^1$, and $M^2$ stand for cations.

3. The compound of the formula:

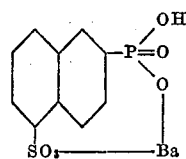

4. The compound of the formula:

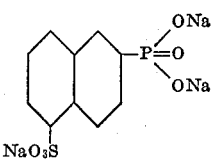

5. A compound of the formula:

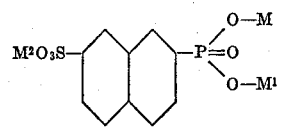

where M, $M^1$, and $M^2$ stand for cations.

6. A compound of the formula:

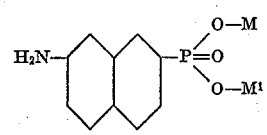

where M and $M^1$ stand for cations.

7. A compound of the formula:

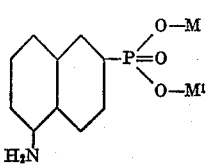

where M and $M^1$ stand for cations.

References Cited in the file of this patent

UNITED STATES PATENTS 2,553,417    Ladd et al. _____ May 15, 1951